US008625889B2

(12) United States Patent  
De Oliveira et al.

(10) Patent No.: US 8,625,889 B2  
(45) Date of Patent: Jan. 7, 2014

(54) SYSTEM FOR FOOD RECOGNITION METHOD USING PORTABLE DEVICES HAVING DIGITAL CAMERAS

(75) Inventors: Luciano Reboucas De Oliveira, Salvador/BA (BR); Eduardo Manuel De Freitas Jorge, Salvador/BA (BR); Alberto Almeida De Azevedo Filho, Lauro de Freitas-Bahia (BR); Victor Franco Costa, Salvador/BA (BR); Gustavo De Almeida Neves, Salvador-Bahia (BR); Talmai Brandão De Oliveira, Cincinnati, OH (US); Geovane Dos Santos Anunciacão, Salvador/BA (BR); Eduardo Telmo Fonseca Santos, Salvador/Bahia (BR)

(73) Assignee: Samsung Electronics Co., Ltd., Suwon-Si (KR)

( * ) Notice: Subject to any disclaimer, the term of this patent is extended or adjusted under 35 U.S.C. 154(b) by 118 days.

(21) Appl. No.: 12/981,634

(22) Filed: Dec. 30, 2010

(65) Prior Publication Data

US 2012/0170801 A1    Jul. 5, 2012

(51) Int. Cl.  
  *G06K 9/00*  (2006.01)  
  *G06K 9/34*  (2006.01)
(52) U.S. Cl.  
  USPC .......................................... 382/165; 382/164
(58) Field of Classification Search  
  None  
  See application file for complete search history.

(56) References Cited

U.S. PATENT DOCUMENTS

| | | | |
|---|---|---|---|
| 6,215,893 B1* | 4/2001 | Leshem et al. | 382/128 |
| 8,363,913 B2* | 1/2013 | Boushey et al. | 382/128 |
| 2003/0076983 A1 | 4/2003 | Cox | |
| 2006/0008140 A1* | 1/2006 | Imamura et al. | 382/164 |
| 2007/0116338 A1* | 5/2007 | Fidrich et al. | 382/128 |
| 2008/0240558 A1* | 10/2008 | Li et al. | 382/167 |
| 2008/0260226 A1* | 10/2008 | Moriya | 382/128 |
| 2008/0292169 A1* | 11/2008 | Wang et al. | 382/131 |
| 2009/0033622 A1* | 2/2009 | Kalpaxis | 345/158 |
| 2009/0147992 A1* | 6/2009 | Tong et al. | 382/103 |
| 2010/0098331 A1* | 4/2010 | Meng et al. | 382/164 |
| 2010/0104261 A1* | 4/2010 | Liu et al. | 386/95 |
| 2010/0111383 A1 | 5/2010 | Boushey | |
| 2010/0173269 A1 | 7/2010 | Puri | |
| 2010/0202684 A1* | 8/2010 | Mattausch et al. | 382/164 |
| 2012/0224755 A1* | 9/2012 | Wu | 382/131 |
| 2012/0250984 A1* | 10/2012 | Taylor | 382/162 |

(Continued)

OTHER PUBLICATIONS

Pass, G., "Comparing Images Using Color Coherence Vectors," Proc. the 4th ACM Int. Conf. on Multimedia, pp. 65-73 (1997).*

(Continued)

*Primary Examiner* — Barry Drennan  
*Assistant Examiner* — Feng Niu (57) ABSTRACT

A method for automatic food recognition by using portable devices equipped with digital cameras. With this system, it is possible to identify a previously established food menu. To this purpose, a semi-automated method of segmentation is applied to delineate the regions in which each type of food in an image of a plate of food, captured by a user. Pattern recognition techniques are used in images, integrated into a system whose goal is to label each type of food contained in the photo of a plate of food. No type of preprocessing is performed to correct deficiencies in capturing the image, just using the auto-focus component present in the portable device to capture a clear image.

20 Claims, 4 Drawing Sheets

(56) References Cited

U.S. PATENT DOCUMENTS

2012/0321159 A1* 12/2012 Keller et al. ............... 382/131
2013/0129177 A1* 5/2013 Meinel ....................... 382/131
2013/0182922 A1* 7/2013 Kil, David H. ............. 382/128

OTHER PUBLICATIONS

F. Zhu, M. Bosch, I. Woo, S. Kim, C. Boushey, D. Ebert, and E. Delp, "The use of mobile devices in aiding dietary assessment and evaluation," IEEE Journal of Selected Topics in Signal Processing, vol. 4, No. 4, pp. 756-766, Aug. 2010.*

D. Comaniciu and P. Meer. Robust Analysis of Feature Spaces: Color Image Segmentation. In Proceedings of IEEE Conference on Computer Vision and Pattern.pp. 750-755 1997.*

8 pages—entitled "Food Recognition Using Statistics of Pairwise Local Features," by Yang et al, published in IEEE Intl. Conference on Computer Vision and Pattern Recognition, published on Jun. 13, 2010.

4 pages—entitled "PFID: Pittsburgh Fast-Food Image data sets," Intl. Conference on Image Processing, published on Nov. 10, 2009, by Chen et al to assess the quality of their food recognition system.

* cited by examiner

SYSTEM FOR FOOD RECOGNITION METHOD USING PORTABLE DEVICES HAVING DIGITAL CAMERAS

FIELD OF THE INVENTION

The present invention relates to a method for automatic food recognition by means of portable devices equipped with digital cameras.

With this system, it is possible to identify a previously established food menu. To this end, a semi-automated method of segmentation is applied to delineate the regions of each type of food in an image of a plate of food, captured by a user.

Pattern recognition techniques are used in images, integrated into a system whose goal is to label each type of food contained in the photo of a plate of food. No type of preprocessing is performed to correct deficiencies in capturing the image, just using the auto-focus component present in the portable device to capture a clear image.

BACKGROUND OF THE INVENTION

Food recognition is a relatively new research field, which uses techniques of visual pattern recognition to identify a picture of food in a plate of food.

In the problem of food recognition, the great challenge is to target and identify the various foods on the plate considering environmental issues such as changing lighting, great variability of patterns even within a class of foods (e.g. green, red or black beans, roasted beef, with different sauces on top, cooked, etc.) and possible mixing. Even using known methods of image segmentation and pattern classification, it is still difficult to obtain a high recognition of objects when the problems mentioned are present.

The document titled: "Food Recognition Using Statistics of Pairwise Local Features," by Yang et al, published in IEEE Inti. Conference on Computer Vision and Pattern Recognition, published on Jun. 13, 2010, uses a data set of the document entitled: "PFID: Pittsburgh Fast-Food Image data sets," Inti. Conference on Image Processing, published on Nov. 10, 2009, by Chen et al to assess the quality of their food recognition system. It is important to note that the data sets of food images are eminently snacks, making it easier to be recognized as belonging to classes with more structured standards, for example, sandwiches, French fries, etc.

The patent document U.S. 2003/0076983, entitled: Personal Food Analyzer, published on Apr. 24, 2003, proposes a system for identifying foods in the image. This patent document employs a system of lights mounted on different angles on the portable device in which the food recognition system can be found. From a central camera, with the lights at its ends, two images illuminated by each of the two light sources are captured sequentially. With the two images, the foods are identified, their volumes estimated and their calories obtained from a database of nutritional information of pre-registered food. The two sequential images are used to target the food and estimate the volume of each food from the outline of its shadows. Soon after, only the first image is sent to the food identifier, consisting of a food reference tree. The reference tree is used to estimate the type of food from similar characteristics of color, shape and size. From the description of this patent document, it is understood that the method of identification of too is not robust to variations in food (and even lighting), since they expect food colors, shapes and sizes previously estimated, not being adaptive. In addition, the automatic decision by a plate of food can lead to huge errors, not allowing the user to change the type of food, if it is misidentified. Nothing is reported still on the automatic method to segment the image of the plate of food. Also, there are no details on the method of identifying food.

The patent document 2010/0173269, published on Jul. 8, 2010, makes use of voice and visual patterns to identify a picture of food. In front of a picture of food taken by the user, the latter presents a description of each item in the plate, along with visual patterns, the modules of voice recognition and image recognition identify each food in the picture. The voice recognition step can help to identify any problems with it. With regard to the method proposed in this document for visual pattern recognition, it also employs characteristic of colors and textures, and classify them by support vector machines. The food colors are featured in the color space CIE L*a*b* and for textures are used the histograms of oriented gradients. It is known that the characterization of an object by only basic features, even if the concatenation of two or more characteristics is insufficient to determine the wide variation in standards of food in an image, and so limitations to identify are expected. Integration with voice recognition by identifying a list of characteristics of the food plate in the photo must therefore distinguish a series of visual limitations of the proposed methods.

The patent document U.S. 2010/0111383, published on May 6, 2010, proposes a system to record calories from automatic recognition of pictures of food taken by a portable camera. The photo of a plate of food is taken before and after eating, for the calculation of food eaten. The proposed application provides several ways to do it, as manually from the photo of captured food up to automatically from lists of suggested foods for each food recognized segment of image. The automatic recognizer presented in this document is executed on a computer, causing the portable device to be connected via the network to this server application. Thus, after the picture is taken, it is sent to the server, where an idealized system of pattern recognition is performed to segment each type of food. The requirement to be connected to a computer network makes use of the method proposed by the document U.S. 2010/0111383 limited to local access network and the existence of a network computer application for recognition. In addition, the use of Gabor filters also makes high computational cost for responding to input images, which can annoy most users of portable devices. Additionally, the segmentation based on threshold methods does not make the application suitable for all types of lighting problems.

Therefore, to address these problems, the present invention provides a method for food recognition by extracting features based on colors and textures. The first, we use the color space CIE L*a*b*, HSV and RGB in order to represent the colors of the foods in way that it is as invariant as possible to different types of lighting environment. With the concatenation of robust features of textures using Gaussian difference and coefficient of spatial variation, it was possible to obtain multiple spaces of hypotheses which are classified by robust classifiers based on support vector machines (SVM) with radial based kernel-type function. By means of multiple 'classification hypotheses, it is obtained therefore a method capable of dealing with the problems mentioned above.

Despite technological advances, portable devices still have relatively limited hardware resources to run algorithms that perform advanced calculations. To address these limitations, the present invention applied parallel execution techniques aiming to reduce the computational cost, allowing a reduction in decode time and minimizing the use of the processor of the portable device. These techniques also provide an increased robustness of the food identifier, since it was possible to use stronger methods without increasing the computational cost, besides allowing the identification in a timely manner.

To prevent the image from the plate of being captured in a distorted or unfocused, auto-focus of the device is triggered, preventing this problem.

In order to increase the robustness of the identification of the object and its corresponding segmentation in the image, we used a combination of the method of segmentation and identification so that the two work in order to help each other. The segmentation method operates in three different and robust color spaces under certain image conditions. Then, color and texture features are extracted for each segment-hypothesis established by the segmenting method, and a probability of being a list of foods is listed for each data segment. A reclassifier based on contexts previously listed is used to reorder the list provided by the classifier of patterns. The choice of the segment and list of foods with a better chance is finally provided to the end user, so that he can reaffirm the best chance of the list or simply choose a food that best identifies the image on the plate. With this, the problems on variation of the same pattern in the image are handled due to different lighting environments in which the pictures will be taken. The volume of each food on the plate is estimated by approaching its area. At the end, the calorie relationship between volume and type of food is obtained through a pre-registered table of values.

BRIEF DESCRIPTION OF THE DRAWINGS

The objects and advantages of the present invention will become apparent from the following detailed description of an exemplary embodiment of the invention and attached drawings by way of non-limiting example, in which.

DESCRIPTION OF PREFERRED EMBODIMENTS OF THE INVENTION

The method of the present invention segments each food on a plate of food image, identifying these foods segmented from a pre-set menu. The method runs on a portable device equipped with a digital camera, and therefore it is provided a device designed for human utility for identification and recording of foods and their calories over a period. In a preferred embodiment of the invention, the method segments and identifies food in an image of a top of a food plate, running in a small space-time.

The present invention enables a portable device equipped with a digital camera to identify food. To this purpose, methods to segment and identify the food on the plate of food were designed.

Figure 1:
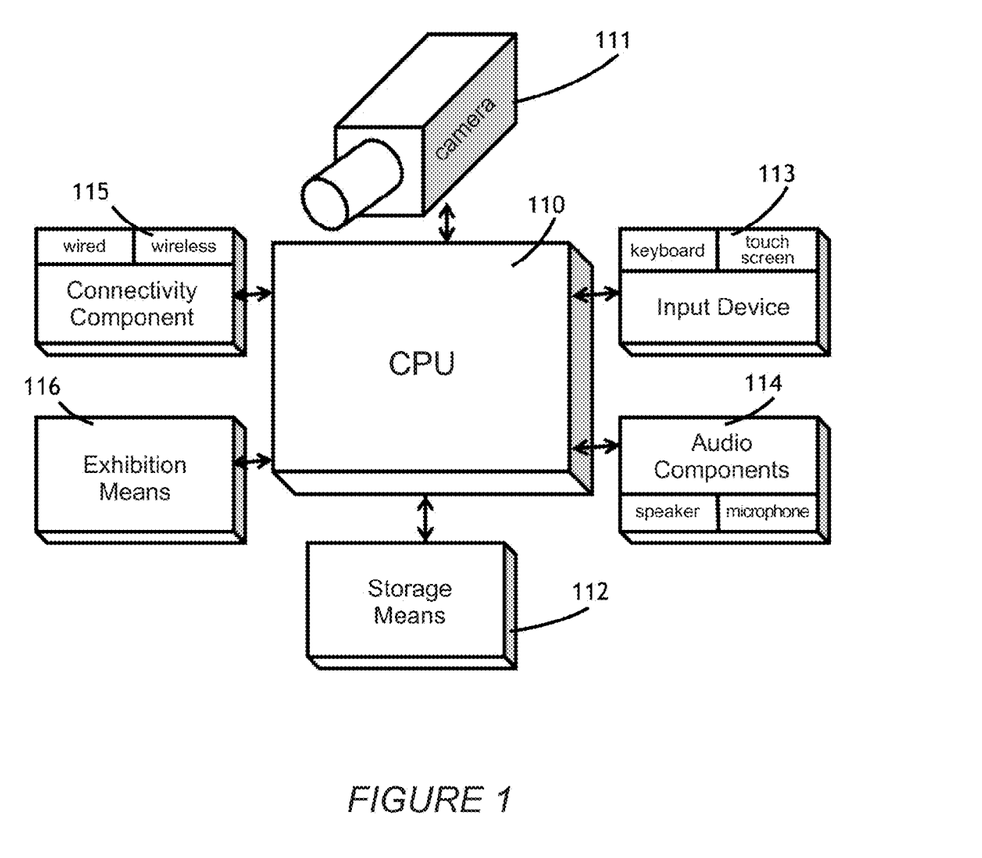
FIG. 1 represents the hardware architecture of the food recognition method.

The hardware needed is a portable device, where its main features are illustrated in FIG. 1. The CPU (110) (Central Processing Unit) is responsible for executing the necessary instructions for managing the camera, and make the computations for processing the image with the food, the camera (111) to capture images and have a sufficient focus for the captured image maintaining its clearness and yet, according to the preferred embodiment of the invention, having auto-focus. The storage medium {112} serves to store information and data, viewed item, among others. The hardware also consists of information input devices (113) and audio components (114). Through some connectivity component (115) it is possible to communicate between the application and a remote database that has information about the products. The display means (116) is used to view images captured by the camera device.

When the user runs the application from a portable device with an architecture similar to that of FIG. 1, in which the application was previously installed.

Technical/Functional Advantages of the Invention

Low computational cost: seeking to improve the method of identification of food were used programming practices that optimize the performance of computer instructions, for example, using fixed point instead of floating point, use bit manipulation to perform certain operations, use the minimum possible instructions to scan or copy the pixels of an image, approximating the Euclidean distances to the integer values in the module and using buffer for characteristic of the object in the image.

Identification of food effectively: Identification of food is carried out effectively, since it succeeds in most attempts to identify foods separated on the plate, being possible to identify even in different lighting environments. Use of concurrent programming: concurrent, robust and agile computing techniques were used and communication between processes, causing the system to display the results immediately after the choice of the center of the image of the food. Using this technique, it is possible to perform the entire process of food identification without affecting the exhibition rate of the camera's preview.

Semi-automatic segmentation: it is known that fully automatic segmentation methods are still inefficient for use in images taken in different lighting situations. Thus, a semi-automated method to segment objects in the photo of the plate was employed. For this purpose, the user must choose the centers of the image of each food, and then a method based on region broadening is applied. Thus, it was possible to obtain robust results in segmentation from the user control.

A new method of integration between the segmentation and identification from multiple hypotheses: in the present invention a method based on the integration between segmentation and identification through multiple hypotheses is proposed. Thus, a segmentation method based on region broadening is applied to three different and robust color spaces to different situations in the image (HSV, L*a*b* and ROB). Then, a classifier based on support vector machine (SVM) with radial based kernel-type function, with optimal parameters obtained through a cross validation method is used on each segmentation hypothesis. For each segment, several fixed-size cutouts are extracted. For each cut-off, features of color, texture and shape are extracted. These characteristics are used as input to SVM for said identification of a segment containing food, as it will be detailed below.

Aim to take pictures of the plate: it was created aim designed in the preview image of the photo of the plate. With this, we establish a standard distance to take pictures through the framework of the plate in the circle of aim, making it possible to estimate more efficiently the volume of food from the plate.

Use of hardware device with high mobility: the present invention can be performed on any portable device, equipped with camera, small and light that can be carried to different places without taking up much space. With this, we obtained a portable device and immediate and effective identification of foods.

Figure 2:
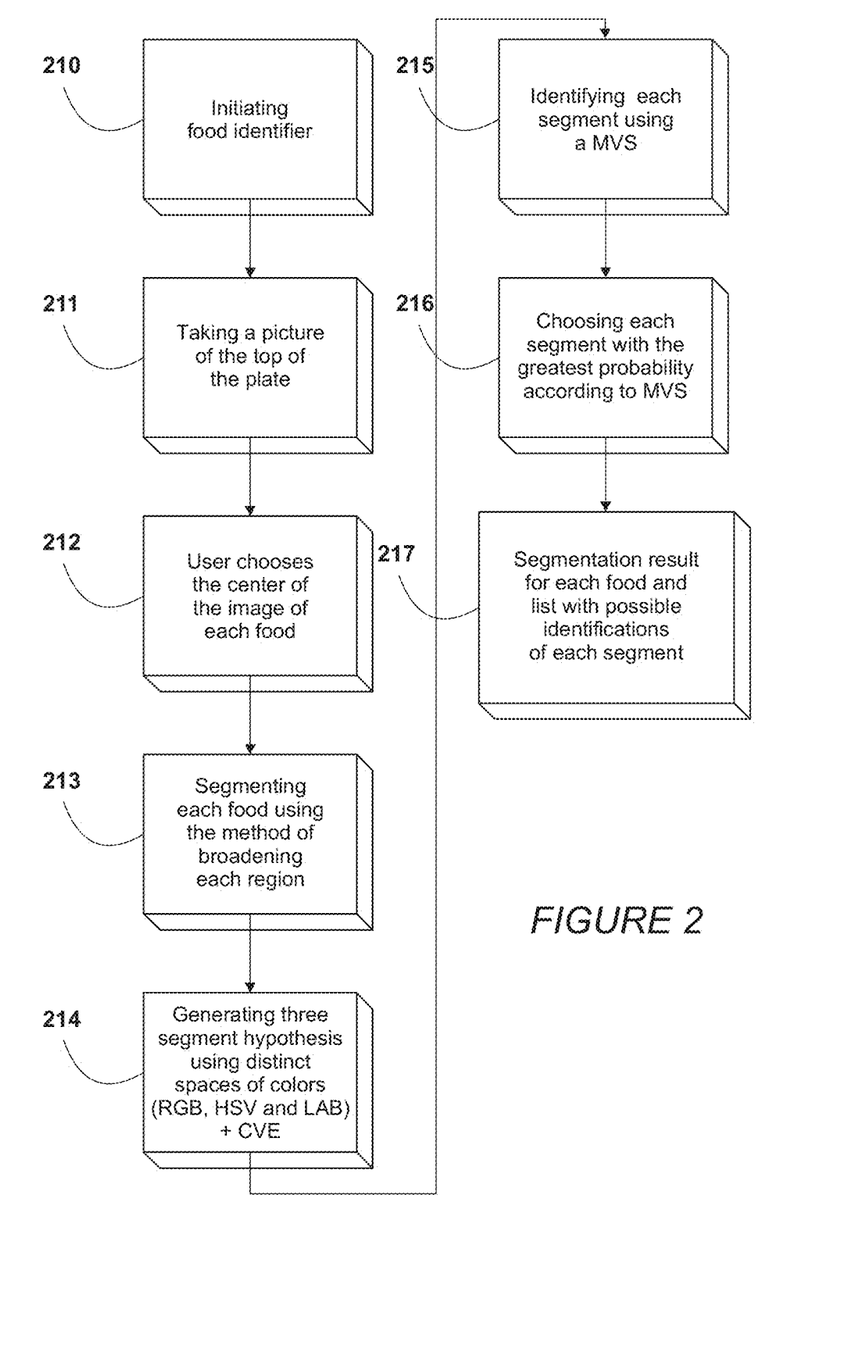
FIG. 2 shows the execution flow of the method in a portable device.

FIG. 2 shows the sequence of steps beginning at the capture of the photo of the top of the plate (210) to the suggestion of a list of foods for each food plate (217). After initialization, the digital camera device is triggered by the user and it will show in the "display" the photo from the top of a plate of food (210). Then, the user chooses the center of the food in each photo (211). The centers being set, the region broadening method is applied to each center and on different color spaces (HSV, RGB and LAB) (212), providing three hypotheses of segments chosen for each center (214). With each segment obtained at (214), an SVM is trained with a radial based kernel-type function (215), and from a predetermined menu of food images, a list of foods likely to be obtained for each segment. In the end, the segment with highest probability is chosen (216) and the results of targeted food and their possible identifications (217) are shown.

Figure 3:
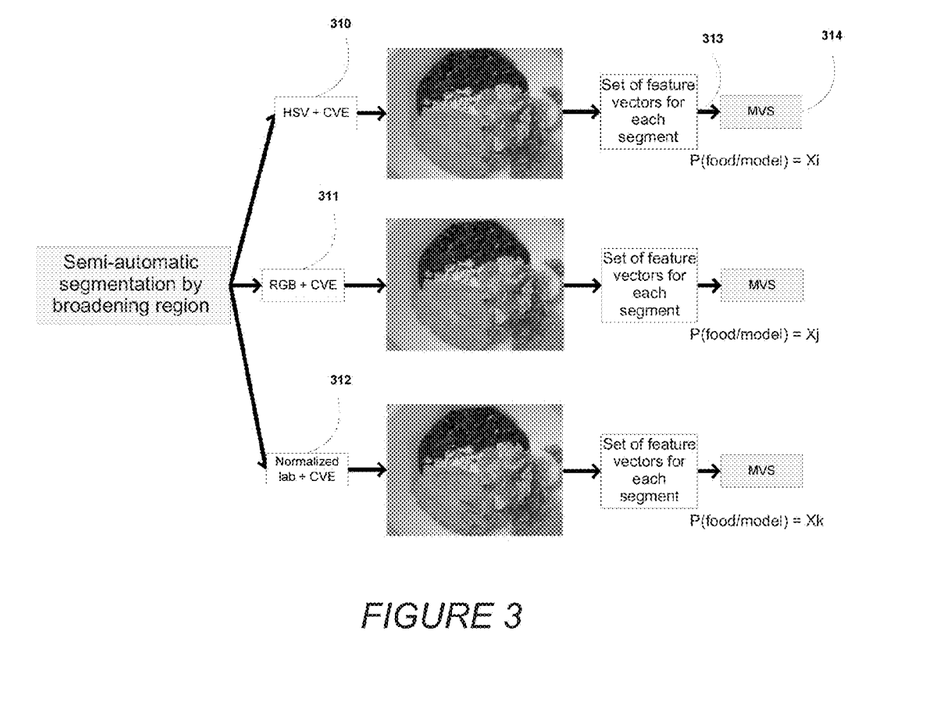
FIG. 3 illustrates the architecture of a portable device.

The method proposed by the present invention to integrate the segmentation and identification of foods is shown in FIG. 3. Three hypotheses (310, 311, 312) are generated by the segmentator based on broadening the region, from three color spaces: RGB, HSV and CIE L*a*b*. For each color space, coefficients of spatial variation (CV) are computed, where effectively the segmentation method is applied. The CV is responsible, therefore, for defining the texture of each color, and is obtained from the two following equations:

$$\bar{x} = \frac{\sum_{i=1}^{n} xi}{n} \quad (1)$$

where:

$$CV = \frac{DP}{\bar{x}} 100, \quad (2)$$

$\bar{x}$ is the average color of a pixel region;
DP is the standard deviation of the pixels belonging to the region under analysis; and
CV is the variation coefficient.

The three color spaces used were chosen from ten initial color spaces. The selection process was determined as follows:

1) By means of a manual segmentation tool, twelve images of plates of food were segmented and duly noted;
2) Next, it was created an index to determine the quality of automatic segmentation based on broadening the region by means of:
   a. $S = A_{GT} \cap A_{RG} + A_{RG} - (A_{GT} \cap A_{RG})$, where $A_{GT}$ is the area of the segment manually given (ground truth), $A_{RG}$ is the area of the segment given by the automatic segmentator based on broadening the region, the higher the score S, the higher the quality the automatic segment;
3) After finding the value of S to ten different color spaces, the spaces with the three highest values of S were obtained (in this case, HSV, RGB and L*a*b with CVs for each space).

It is important to indicate that in segmenting by broadening regions, the regions of the image are grouped based on the minimum difference between the moving average on the given region and its neighbors. This minimum difference is attributed empirically and consists of the threshold that defines the sensitivity level. After selection by the user of the centers of the regions of the image containing foods, the following steps are applied:

1. Initializing the parameters L, (x0, y0), M0, D0 and V0 corresponding, respectively, to the threshold, position of the center of the image region, the initial moving average, an array of pixels neighboring the current region, ignoring pixels on the diagonal, and finally, a vector of differences between the neighbors below the threshold L (given by the Euclidean distance between the values of pixels). In this first iteration, the moving average corresponds to the initial value of this pixel at position (x0, y0), which, according to the present invention, are the three components of the color spaces used for each hypothesis segment;

2. At each iteration, the position of the last neighbor (xi, yi), stored in the vector Vi, is stored in order to compute the new values of the parameters Mi, Vi and Di. The moving average is given by $(M_{(i-1)} * Si) + V_{(i-1)} / (Si+1)$;

3. The final region to be segmented is found when all the pixels within the vector V have values less than the threshold L.

Figure 4:
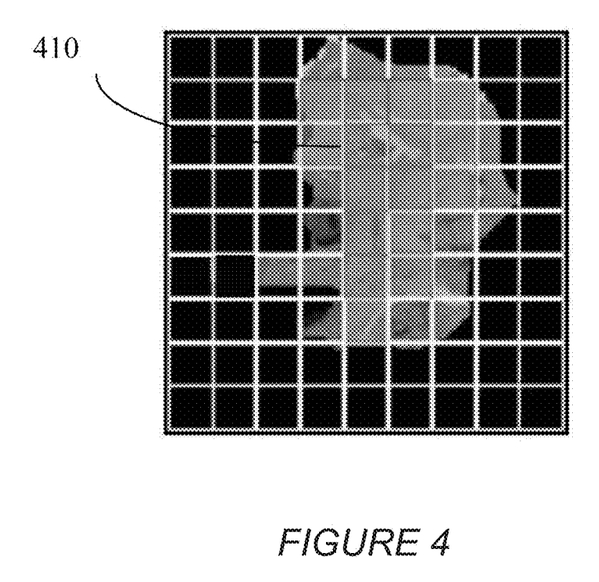
FIG. 4 illustrates the structure of cut-offs within a segment.

FIG. 4 shows a segment of a food in one image. For each segment obtained by the method of automatic broadening the region, a set of square regions of the image size of 30×30 pixels, called cut-off (410) are obtained throughout the area found within the segment. For each cut-off, features of color (RGB and CIE L*a*b*), form (difference of Gaussians [DOG]) and texture (CV on doGs) are extracted. The feature vector is composed as follows for each cut-off:

It is applied a DoG in each RGB channel, and obtained a CV for each space in the doG; in this step, there are therefore three elements;

It calculated the average of the R, G and 8 of each cut-off, and there are therefore three elements;

It is computed the average across the channel L*a*b", obtaining three more elements;

For each color channel L*a*b*, it is calculated CV, finally, obtaining three more elements.

Therefore, a vector of twelve elements (313) is classified by an SVM (314) using a radial based kernel-type function. In turn, the SVMs will be responsible for turning the input space into a higher dimensional space, however, linearly separable. This feature, along with the fact that the learning function is convex and quadratic, makes a SVM one of the best known classification methods, as it allows obtaining, in most cases, an overall minimum for separation of input objects having maximal margin of separation. To turn the input space into a linearly separable space, the SVMs use a kernel function that is applied from an operation of internal space, ie, it increases the input data to a higher dimensional space only virtually (without necessarily effect the mentioned transformation). The choice of kernel function is dependent on the input space. In general, the radial based kernel-type function provides the best results and is defined by:

$$K(x_i, x_j) = \exp(-\gamma \|x_i - x_j\|^2), \gamma > 0 \quad (3)$$

where xi and xj are elements of the input space and γ, a kernel parameter. The parameter γ is obtained by cross-validation, dividing the training data set into five disjoint sets, and using one for training and the remainder for validation, and repeating until all the subsets of the set of initial data have been used for training and the classification error is minimal.

After obtaining the parameter, the entire data set used for cross-validation is now used to train the classification model. This data set consists of feature vectors (with twelve elements, as mentioned above) obtained from cut-offs of multiple segments manually set and containing foods. At the end, it is obtained a model of multi-classification. Such model is obtained from a menu of pre-determined food and can be updated over time.

In the prediction phase (or identification itself), the SVM classifies each cut-off present in one segment, providing a "score", calculated by the distance between the vector to be classified and the separation hyperplane, which is given by:

$$y(x) = w^t k(x) + b \quad (4),$$

where y is the output function, x is the input vector, w is the weight matrix obtained during training, k is the kernel function and b is the polarization vector (bias).

In the case of multi-classification, the method used is the "one-versus-one", where C (C−1)/2 binary classifiers are trained from the training data, obtaining the combination of all data from two to two classes. The "score" obtained by the distance between the point to be classified and the separating hyperplanes is given in the interval [0, ∞). To convert the current value into probability, it was used a logistic function given by:

$$f(s) = \frac{1}{1 - \exp(As + B)} \quad (5)$$

where s is the score given by the SVM, and A and B are parameters obtained in training and approach 1 and 0, respectively, in practice. After that, the outputs of the classifiers are probabilistic, i.e., in the range between 0 and 1.

As in a given segment there are several cut-offs, the final probability of a segment is a specific element is given by the average of the probabilities of all the cut-offs for a given food. At the end, it will be obtained probabilities for various foods. Since some cut-offs can be wrongly classified, the food with the highest probability will define the segment. It is important to mention that the final probability is given by:

$$p_{final} = \max(p_i)_{i=1}^{3} \quad (6)$$

which corresponds to the probability obtained for each hypothesis segment of the segmentator.

Rather than just providing a final food hypothesis, the identification system of food off obtaining this list of SVMs, a reordering of the list based on context is applied.

In the solution to the problem of food recognition, the final classification made by SVMs presents an ordered list of possible foods. In this list, however, due to several factors, there is still the possibility of errors in classification. So, to deal with these uncertainties, minimizing the misclassification, the MMR method is used. This method is responsible for reordering the final list of SVMs from previously listed requirements and contexts. The MMR method belongs to the class of methods for solving problems of making decisions. For the food recognition, the decision to be made is the choice of food among all the possible alternatives present in the pre-defined food menu. The great advantage of MMR method with regard to other methods is the fact that these contexts do not need to be defined precisely. Therefore, parameters and situations can be modeled loosely, giving flexibility and robustness to the method, while the results generated continue to be deterministic.

Given the mobile environment with limited processing and strict timing requirements from the user, it presents the following solution to a contextual handling of the uncertainties in the classifications made by SVMs.

Even considering robust classifiers as SVMs, it is not possible to guarantee that the food recognizer, with the structure described so far, will succeed in every situation, since foods with similar color and texture may belong to different categories. A decision would need robust computationally expensive methods to distinguish all kinds of food similar to texture, color or shape. For this reason, after classification with SVMs, contextual information is used in order to increase the robustness of decisions in naming foods. This step was called contextual reclassification.

The process of automatic food recognition presents an imprecise nature as to the process of capturing and manipulating images in portable devices, or as to the decisions made in the classification process by SVMs. For the latter situation, an ordered list of probabilities provided by SVMs can provide an incorrect answer. Additionally, food can vary in color and texture from country to country, and methods need to adapt dynamically to unknown factors. This makes a universal solution makes the final application difficult to be managed by the end user when the user demands vary, the rating performance is lower than expected or when the user's preferences change. In view of the aforementioned, the problem of decision making in the food recognitions can be considered as a selection of the best alternatives based on partial uncertainties (SVMs outputs). Such uncertainties will be resolved in the final step, from the MinMax method Regret (MMR), under the approach to reclassify the list provided by SVMs.

The MMR method works by constructing a regret matrix (regret), which elements show the "regret" of the decision maker in solving an alternative Ai, for a given attribute Cj associated with a weight wij, as in table below:

$$\begin{array}{c} & C_1 & C_2 & \ldots & C_n \\ A_1 & \begin{pmatrix} w_{11} & w_{12} & \ldots & w_{1n} \\ A_2 & w_{21} & w_{22} & \ldots & w_{2n} \\ \vdots & \ldots & \ldots & \ldots & \ldots \\ A_m & w_{m1} & w_{m2} & \ldots & w_{mn} \end{pmatrix} \end{array}$$

For each alternative, we compute the maximal regret and the effective range of the score is obtained by selecting the maximal remorse. The aim of the method is to choose the results that show the minimum remorse, with the following steps:

Calculating Wj=Max [w ij] for each Cj and all Ai's;
Calculating rij=Wj−wij for each combination of Ai's and CJ's;
Computing Ri=Max [rij] for each Ai's and all Cj's;
Selecting A*I*R such that i=Min [Ri].

In the steps listed, rij represents the elements of regret matrix; Ri is the maximal regret obtained for each alternative Ai and R*i is the minimum maximal remorse. The regret matrix is normalized to unity, as follows: N (rij)=rij/(Wjmax−Wjmin) Finally, the maximal regret is given by: Ri=Maxi [rij]. Instead of using a food on each element rij, it was a class of foods grouped by similarity of color and texture. Thus, after reclassification, not only those particular foods will be reordered, but also groups of objects with similar visual characteristics. This will make the next phase, in which the user manually distinguishes possible recognition errors more accurate, making the final application more reliable.

It is important to note that even though this method of food recognition in some ways, shows some incorrect result, the user can still correct identifications of food through a manual note tool, available in this application that incorporates such a food recognition method.

Although a preferred embodiment of the present invention is shown and described, those skilled in the art will understand that various modifications can be made without departing from the spirit and scope of the present invention, as defined in the appended claims.

The invention claimed is:

1. A method for food recognition using a portable device equipped with a digital camera to record food and calories, the method comprising:

segmenting items of food of a top-view photo of a plate of food into regions using the centers, selected by a user, of each item of food;

broadening the regions based on each center and on different color spaces (HSV, RGB, and LAB);

providing three hypotheses of segments chosen for each center to obtain robust results from the segmentation;

training, for each hypothesis, a Support Vector Machine (SVM) having a radial based kernel-type function;

obtaining, from a predetermined menu of food images, a list of probabilities for each segment of food;

choosing the segment with the highest probability; and showing the results of segmented food and their possible identifications.

2. The method of claim 1, wherein coefficients of spatial variation (CV) are computed for each color space the segmentation method is applied to, and the CV defines a texture of each color.

3. The method of claim 1, wherein, for each segment obtained by the broadening of regions, a set of square regions of the image having 30×30 pixels in size are obtained throughout the area found within the segment.

4. The method of claim 1, wherein, for each feature are extracted features of color (RGB and CIE L*a*b*), form (difference of Gaussians [DOGs]) and texture (CV on doGs).

5. The method of claim 1, wherein the feature vector is composed as follows for each cut-off:
a DoG is applied to each RGB channel, and a CV is obtained for each space in the DoG, generating three elements;
the average of the R, G and B channels of each cut-off is computed, generating three more elements;
the average across the channel L*a*b* is computed, obtaining three more elements;
a CV is computed for each color channel L*a*b*, obtaining three more elements, being the vector composed of twelve elements sorted by an SVM using a radial based kernel-type function, and the SVMs will be responsible for transforming the input space into a higher dimensional space, however, linearly separable.

6. The method of claim 1, wherein at the stage of prediction, the SVM classifies each cut-off present in one segment, providing a "score" obtained by the distance between the vector to be classified and the separation hyperplane.

7. The method of claim 1, wherein the probability of a final segment is given by the average of the probabilities of all cut-offs of a given food, and at the end, the probabilities of various foods are obtained.

8. The method of claim 1, wherein, since some cut-offs can be classified incorrectly, the food with the highest probability will be used for the segment.

9. The method of claim 1, wherein instead of providing only a hypothesis of the final food, the food identification system provides a list of foods in decreasing order by probability.

10. The method of claim 9, wherein, after obtaining this list of SVMs, a reordering of the list based on context is applied.

11. The method of claim 9, wherein in that ordered list of possible food, there is still the possibility of errors in classification.

12. The method of claim 1, wherein to deal with uncertainties, minimizing the classification errors, a MMR method, which is responsible for reordering the final list of SVMs from requirements and contexts listed previously is used.

13. The method of claim 1, wherein, after qualifying with SVMs, using contextual information in order to increase the robustness of naming food.

14. The method of claim 1, wherein the decision on the food recognition is made from the best selection of alternatives based on partial uncertainty, SVMs outputs, and these uncertainties are solved, in the final stage, from the MinMax method Regret (MMR), under the approach of reclassifying the list provided by SVMs.

15. The method of claim 14, wherein the MMR method works from the construction of an regret matrix whose elements show the "regret" of the decision maker in solving an alternative Ai, for a given attribute Cj associated with a weight wij, as follows:

$$\begin{array}{c} & C_1 & C_2 & \ldots & C_n \\ A_1 & \begin{pmatrix} w_{11} & w_{12} & \ldots & w_{1n} \\ A_2 & w_{21} & w_{22} & \ldots & w_{2n} \\ \vdots & \ldots & \ldots & \ldots & \ldots \\ A_m & w_{m1} & w_{m2} & \ldots & w_{mn} \end{pmatrix} \end{array}$$

and for each alternative, the maximal regret is computed and the score of the effective range is obtained by selecting the maximal remorse.

16. The method of claim 14, wherein the results are chosen to show the minimal remorse, from the following:
calculating Wj=Max[wij] for each Cj and all Ai's;
calculating rij=Wj−wij for each combination of Ai's and CJ's;
calculating Ri=Max[rij] for each Ai's and all Cj's; and
selecting A*I*R such that i=min[Ri], with the maximal regret given by: Ri=Maxi[rij].

17. The method of claim 14, wherein instead of using a food on each element rij, a class of foods grouped by similarity, color, and texture is used.

18. The method of claim 17, wherein, after reclassification, not only particular foods will be reordered, but also groups of objects with similar visual characteristics.

19. The method of claim 18, wherein the user manually distinguishes possible recognition errors.

20. The method of claim 1, wherein the user can further correct identifications of food through a manual note tool, if any incorrect result is displayed.

* * * * *